US010870171B2

(12) United States Patent
Conseil et al.

(10) Patent No.: US 10,870,171 B2
(45) Date of Patent: Dec. 22, 2020

(54) METHOD FOR DEFINING A LASER TOOL PATH

(71) Applicant: Agie Charmilles New Technologies SA, Meyrin (CH)

(72) Inventors: David Conseil, Collonges-sous-Salève (FR); Charles Eric Laporte, Clamart (FR)

(73) Assignee: GF Machining Solutions AG

( * ) Notice: Subject to any disclaimer, the term of this patent is extended or adjusted under 35 U.S.C. 154(b) by 262 days.

(21) Appl. No.: 16/019,956

(22) Filed: Jun. 27, 2018

(65) Prior Publication Data

US 2019/0001436 A1  Jan. 3, 2019

(30) Foreign Application Priority Data

Jun. 29, 2017 (EP) .................................... 17178597

(51) Int. Cl.
*B23K 26/08* (2014.01)
*B23K 26/082* (2014.01)
(Continued)

(52) U.S. Cl.
CPC ........ *B23K 26/0869* (2013.01); *B23K 26/064* (2015.10); *B23K 26/082* (2015.10);
(Continued)

(58) Field of Classification Search
CPC . B23K 26/355; B23K 26/362; B23K 26/0884
See application file for complete search history.

(56) References Cited

U.S. PATENT DOCUMENTS

2011/0048254 A1* 3/2011 Espe .................... B23K 26/355
    100/35
2011/0120981 A1* 5/2011 Paganelli ............... B23K 26/16
    219/121.67
(Continued)

FOREIGN PATENT DOCUMENTS

DE      4209933 A1    9/1993
EP      3047932 A1    7/2016
WO   WO-00/74891 A1  12/2000

OTHER PUBLICATIONS

Extended European Search Report for Application No. EP 17178597.5 dated Jan. 12, 2018 (7 pages).

*Primary Examiner* — Ibrahime A Abraham
*Assistant Examiner* — John J Norton
(74) *Attorney, Agent, or Firm* — Harness, Dickey & Pierce, P.L.C.

(57) ABSTRACT

The present invention relates to a method for defining a sequence of relative positionings of a laser head 1 in relation to a part for the machining of a texture etched on the two-dimensional or three-dimensional surface 7 of the part modelled by a 3D meshing, comprising:
  a step 100 of definition of N machining layers intended to be performed in succession,
  a step 200 of definition, for each machining layer, of patches intended to be each machined from a single position of the laser head 1, comprising closed patches 15, the boundary of which is not affected by the laser ray 2,
  a step 300 of validation of the closed patches 15, successively from the machining layer 1 to the machining layer N.
Open patches whose boundary is affected by the laser ray 2 being defined for any areas which could not be machined from validated closed patches 15. Optionally, the method
(Continued)

also comprises a step 400 of merging of the validated closed patches 15 into groups 50 of patches.

9 Claims, 8 Drawing Sheets

(51) Int. Cl.
*B23K 26/352* (2014.01)
*B23K 26/362* (2014.01)
*B23K 26/064* (2014.01)

(52) U.S. Cl.
CPC ...... *B23K 26/0823* (2013.01); *B23K 26/0884* (2013.01); *B23K 26/355* (2018.08); *B23K 26/362* (2013.01)

(56) References Cited

U.S. PATENT DOCUMENTS

| | | | | |
|---|---|---|---|---|
| 2015/0367443 | A1* | 12/2015 | Nashner | B23K 26/103 264/400 |
| 2016/0193698 | A1* | 7/2016 | Hildebrand | B23K 26/356 219/121.69 |
| 2016/0207141 | A1* | 7/2016 | Conseil | B23K 26/361 |

* cited by examiner

METHOD FOR DEFINING A LASER TOOL PATH

CROSS-REFERENCE TO RELATED APPLICATIONS

This application claims the benefit and priority of European Patent Application No. 171785975 filed Jun. 29, 2017. The entire disclosure of the above application is incorporated herein by reference.

BACKGROUND OF THE INVENTION

Field of the Invention

The invention relates to the field of laser machines, and in particular the definition of efficient machining paths. The invention more particularly targets a method for defining a sequence of relative positionings of a laser head in relation to a part for the machining of parts by laser texturing, as defined by the preamble of claim 1.

Discussion

The machines for machining parts by laser texturing are known generally. The patent application EP 2 301 706 describes an example of such a machine.

FIG. 1 schematically represents an example of construction of a laser texturing machine. The head 1 of the machine and the part are positioned in relation to one another according to 5 mechanical axes, which makes it possible to orient the direction of the laser ray emitted and to position the focal point of the laser on the surface of a machined part, not represented, placed in the machine. In the example represented in FIG. 1, the laser head 1 may be displaced in the three dimensions X, Y and Z of a Cartesian reference frame. Advantageously, the head is also mobile in rotation about a rotation axis (B), so as to obtain a greater accuracy and a greater flexibility. A second rotation axis (C), not represented, is installed alongside the part. This method of construction is particularly suited to parts of large dimensions. Other machine configurations are possible, for example using a part-holding device that is mobile according to one or more axes, the laser emission source then being mobile according to a lesser number of axes, even being fixed. Such configurations are better suited to parts of smaller dimensions. In the rest of the disclosure, it will be considered that, for all the examples given, it is the laser head which is mobile according to five axes (three axes in translation and two axes in rotation). Naturally, it is the relative position of the laser head in relation to the surface to be machined that is the determining factor and consequently equivalent examples could be supplied with a mobile part-holding device.

FIG. 2 schematically represents an example of laser head 1 used for machining by laser texturing. The laser head can comprise, in particular, devices allowing its rotation about an axis, a laser source, optical devices, and a device commonly called galvanometric module or galvanometer.

FIG. 3 schematically illustrates the operation of a galvanometer. The laser source 3 emits a laser ray 2, or more specifically a pulsed laser ray 2. The laser ray 2 is reflected by mirrors 4 and 5 which respectively make it possible to define, according to the axes X and Y of the Cartesian reference frame, the position of the point of projection of the laser ray on the surface of the part. Actuators 8 make it possible to control the angular position of the mirrors 4 and 5. The laser ray also passes through a lens 6 with a dynamic focusing correction, commonly called F-theta lens. This device thus makes it possible to define the point of impact of the laser ray with the surface 7 of the part in a plane situated in the focal range considered. The focal lengths ranging up to 430 mm are commonplace in the existing machines. The document EP 2 301 706 describes other details of construction of the laser head 1.

Usually, the systems used with a focal length of 430 millimetres make it possible, from a given position of the head 1, to machine, using the galvanometer, a planar surface measuring 300×300 millimetres, called marking field.

On the other hand, when the surface 7 of the part to be machined is not planar, the focusing capacity of the lenses limits the marking field in the directions X and Y. In the devices of the type represented in FIG. 3, this focusing capacity is usually limited to 0.3 millimetres along the axis Z. This value is commonly called the marking depth or marking field on Z. If the curvature of the part is significant, it is then necessary to reduce the dimensions on X and Y of the marking fields for the variation on Z in each marking field to remain less than 0.3 millimetres. Naturally, this consequently increases the number of different positions occupied by the laser head to carry out a texturing job.

This significant number of different positionings linked to the low focusing capacity of the device represented in FIG. 3 considerably increases the machining time. This is why optical devices for zooming on the axis Z have been developed, which make it possible to vary the focusing along the axis Z, and allow the machining of marking fields with marking depths of + or −80 millimetres. An example of use of such a system for a curved surface 7 is schematically represented in FIG. 4. The use of a focus varying device does not eliminate the relative repositionings of the laser head 1 and of the part, but it does substantially limit the number thereof.

The laser ablation techniques used for the texturing work by sublimation of the material, generally metal, on the surface of the part. The machining is performed over several steps, each step corresponding to the machining of a layer of the surface. In effect, on each laser beam pass, the material can be sublimated only for a depth of approximately 1 to 5 micrometres. Because of this, the number of machining layers to texture a surface commonly lies between 20 and 100.

The principles implemented to apply a texture to a 3D surface are widely known, and are disclosed for example in the document DE 42 09 933. The method can be considered as "inverse stereolithography": instead of being created by the addition of successive layers, the desired surface is obtained by ablation of successive layers. The document WO 0 074 891 describes a comparable method.

The 3D forms are modelled numerically by a meshing of usually triangular forms. FIG. 5 represents an example of a form thus modelled.

The textures which have to be applied by laser ablation to the surface of the part are typically defined by a grey-scale image. FIG. 6 illustrates an example of a texture thus defined. The image represents a set of sublimation points in which the grey level of each point defines the ablation depth that has to be obtained at this particular point: the lighter a point is, the less ablation there will be, and the darker the point is, the deeper the ablation will be. The number of different grey levels can possibly equal the number of laser ablation layers, but not necessarily. In effect, the texture images are defined by grey levels coded on eight or even sixteen bits, whereas the number of machining layers, as already indicated, most often lies between 20 and 100. There are many techniques that make it possible to compute the different ablation layers from a texture file coded on a number of grey levels very much higher than the number of machining layers desired.

From the 3D modelling file and the grey level texture file, a set of machining layers is therefore usually computed. Each machining layer has a corresponding black and white image: if a point is white, there is no ablation, and if it is black, there will be ablation by sublimation.

For each machining layer, it is necessary to compute a set of positions of the laser head making it possible to machine all of the layer concerned. As seen previously, the marking field can be as much as 300×300 millimetres for a given position of the laser head, which corresponds to a large number of 3D modelling meshing triangles. The set of the 3D modelling meshing triangles that can be machined from a given position of the laser head is called patch.

The machining layers are ordered: the first layer corresponds to the largest surface area subject to ablation then, as the layers follow one another, the total surface area subject to ablation for each layer decreases, to the last layer which has the smallest total surface area subject to ablation.

A complete texturing machining of the surface of a part therefore consists in performing N ablation layers, with, for each layer, a set of positions that the machining head must reach, so as to machine a patch for each position for the layer concerned. If for example the job is broken down into 37 layers with 6000 positions per layer, then it will be necessary to perform up to 222 000 (37×6000) repositionings of the laser head, a particular scanning of the laser ray being associated with each position for the machining of the patch corresponding to this position.

Naturally, the computation of the positions and of the patches machined requires enormous computer resources: several hours or even several days depending on the complexity and on the dimensions of the part, on the type of algorithm used, on the number of machining layers, etc. This computation is therefore generally performed on a specific workstation or computer, only the result of the computation then being transmitted to the laser machining machine. The result of the computation essentially consists of a machining path, which comprises a succession of positions (defined according to the five axes) that the laser machining head 1 must occupy in relation to the part, and, for each position, a succession of ablation operations corresponding to the scanning that the laser ray must perform from this position. This result directly influences both the machining time and the finishing quality of the texturing.

In effect, the traditional ablation method often generates defects at the boundary of the adjacent patches, in the form of boundary lines that are visible at the edges of the patches. Various methods for reducing these defects have been proposed. As schematically represented in FIG. 7, it is commonplace to define, for two successive layers 9.1 and 9.2, patches 10 which are not superimposed. The document WO 0 074 891 also proposes a method for reducing these defects, but without systematically obtaining good results. The document EP 3 047 932 proposes a particularly advantageous method that makes it possible to limit the defects visible at the boundary of the patches 10, while reducing the machining time. The method described consists in defining, when possible, for each machining layer 9, patches 10 whose boundary is not affected by the laser ablation.

This method generally gives excellent results but defects can nevertheless still appear in certain 3D geometries.

SUMMARY OF THE INVENTION

An aspect of the invention is, in particular, to mitigate all or some of the drawbacks of the prior art. More specifically, an objective of the invention is to reduce as much as possible the duration of the machining work, while obtaining improved surface quality compared to the prior art.

To this end, the preferred embodiment of the invention is directed to a method for defining a sequence of relative positionings of a laser head (1) in relation to a part.

BRIEF DESCRIPTION OF THE DRAWINGS

Other features and advantages of the invention will become more clearly apparent on reading the following description of a particular embodiment, given as a simple illustrative and nonlimiting example, and the attached drawings, in which.

PREFERRED EMBODIMENT OF THE INVENTION

Different embodiments according to the invention are described in relation to figures FIG. 1 to FIG. 15.

Figure 1:
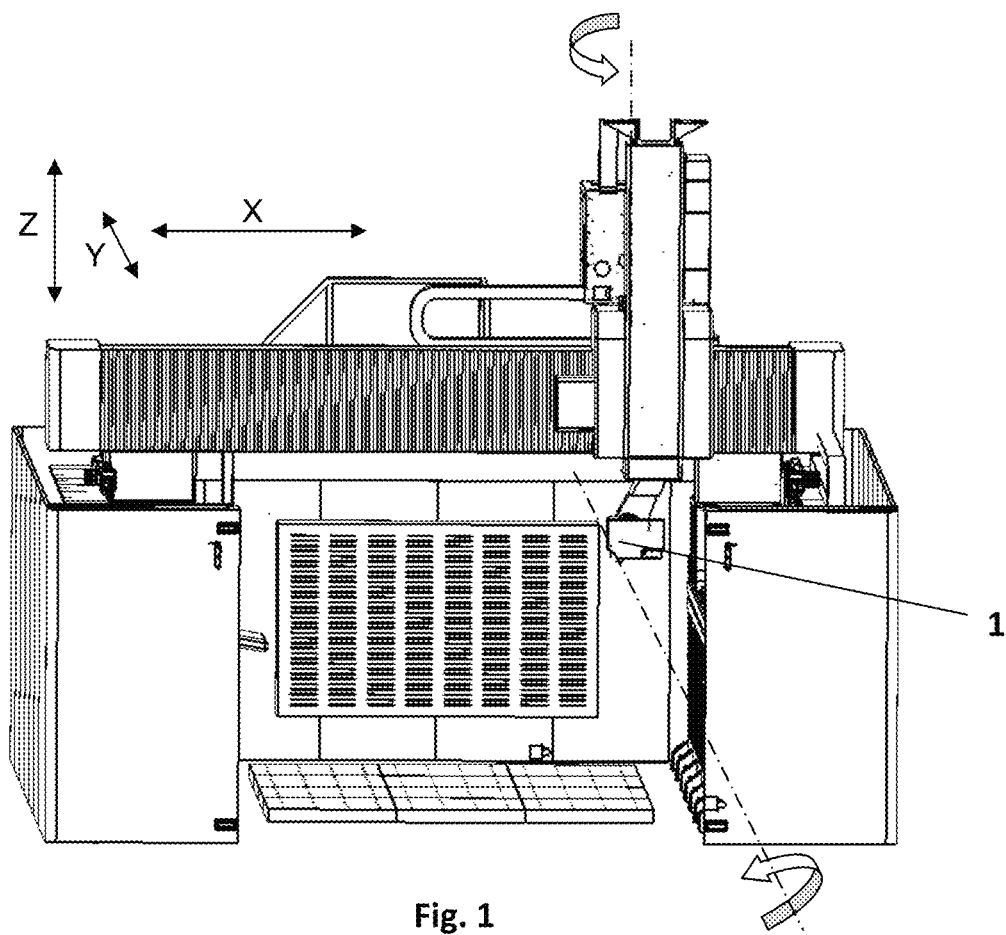
FIG. 1 schematically represents a laser texturing machining machine.
Figure 2:
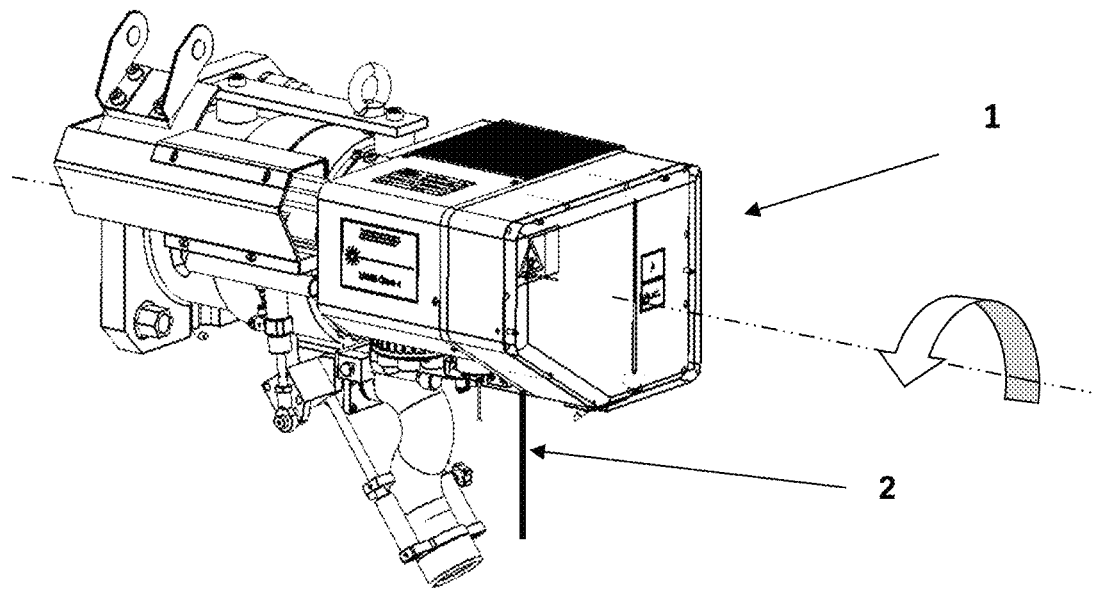
FIG. 2 represents an example of laser head used to texture a 3D surface.
Figure 3:
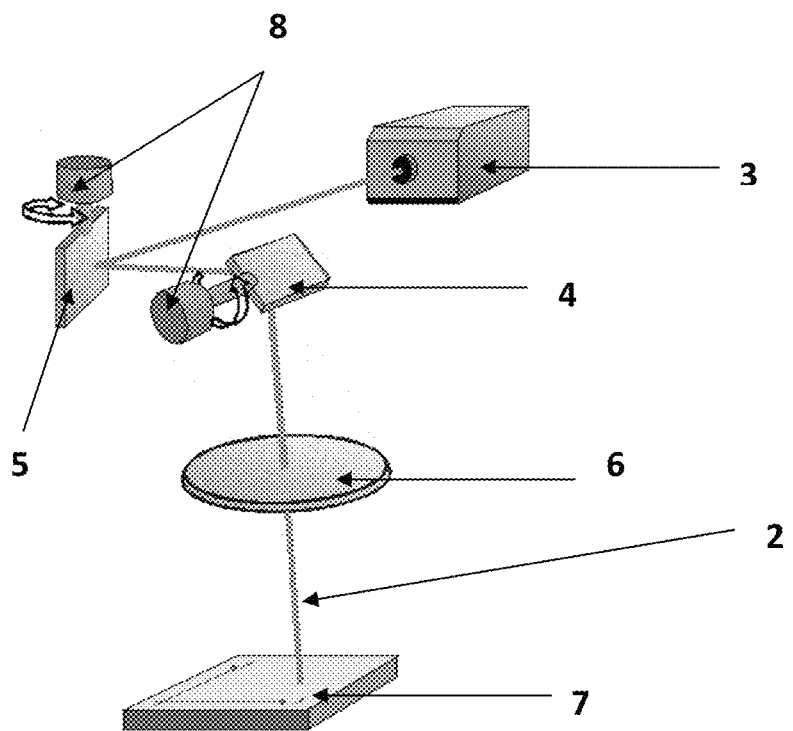
FIG. 3 schematically represents the operation of a galvanometer and a marking field.
Figure 4:
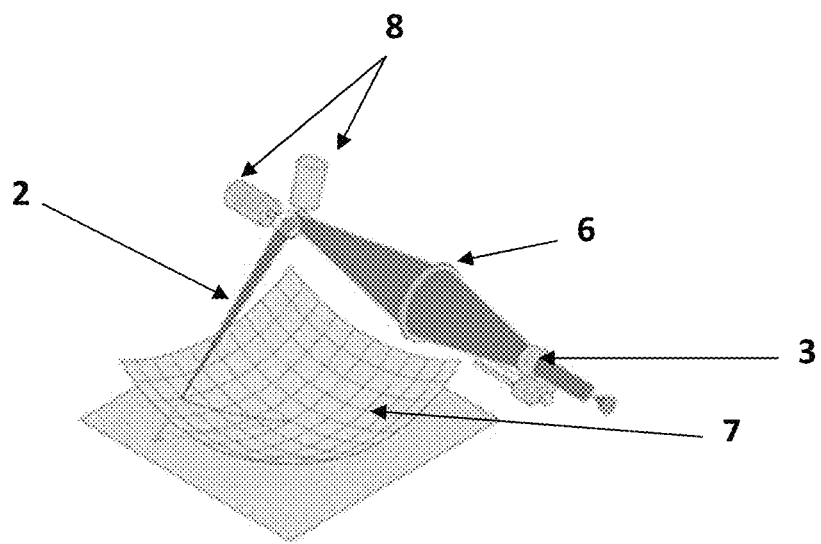
FIG. 4 represents a focus varying device and the marking depth for a curved surface.
Figure 5:
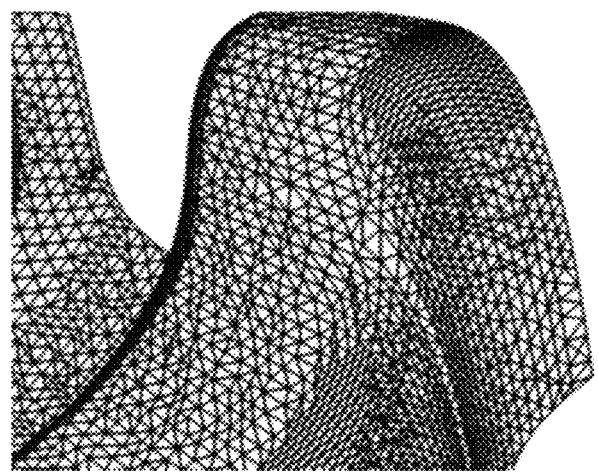
FIG. 5 represents the 3D meshing of the surface of a part.
Figure 6:
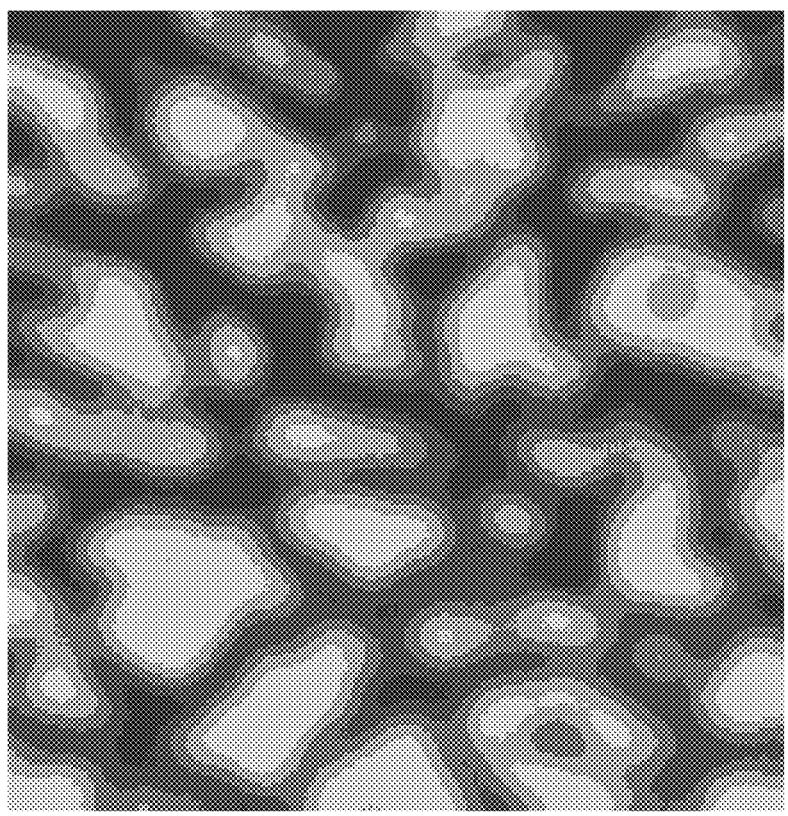
FIG. 6 represents a grey level texturing file.
Figure 7:
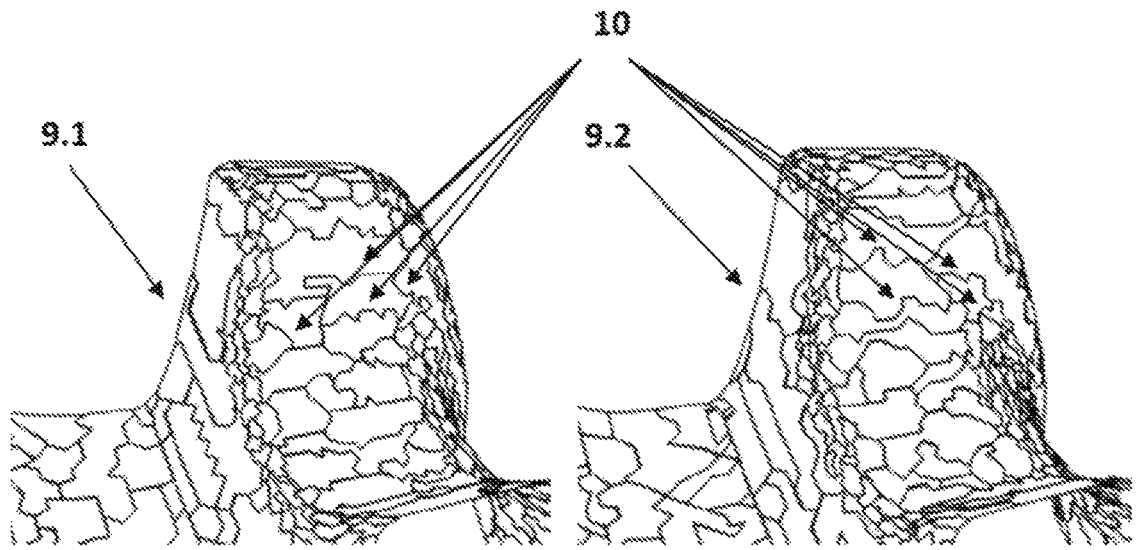
FIG. 7 represents patches on two successive machining layers.
Figure 8:
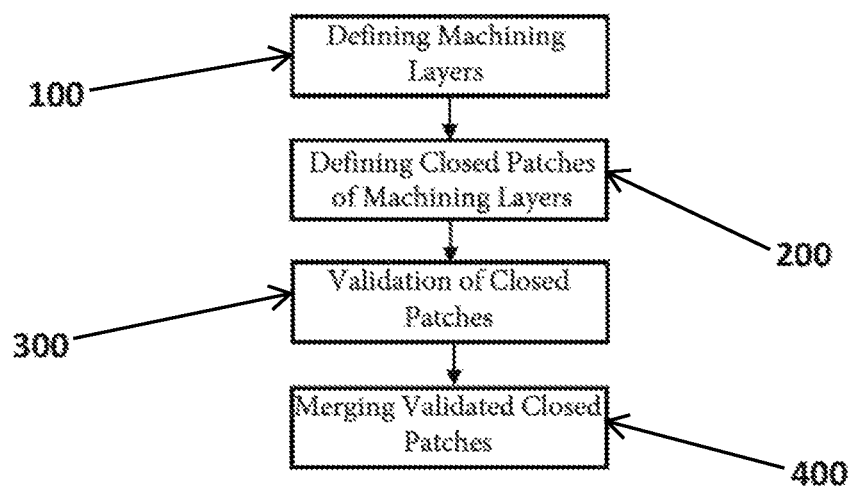
FIG. 8 schematically represents the succession of steps of a method according to the invention.

In order to compute a machining path, a method according to the invention for defining a sequence of relative positionings of a laser head (1) in relation to a part consists of a succession of steps schematically illustrated in FIG. 8.

In a step 100 of definition of layers, N machining layers 12 are computed in the usual way from 3D modelling data of the part and texturing data.

In a step 200 of definition of closed patches, there are computed, for each machining layer 12, based on elements of the 3D meshing of the part, closed patches 15 each intended to be machined from a single position of the laser head 1, and whose boundary is not affected by the laser ray 2. These closed patches 15 correspond to the patches defined in the document EP 3 047 932.

Figure 9:
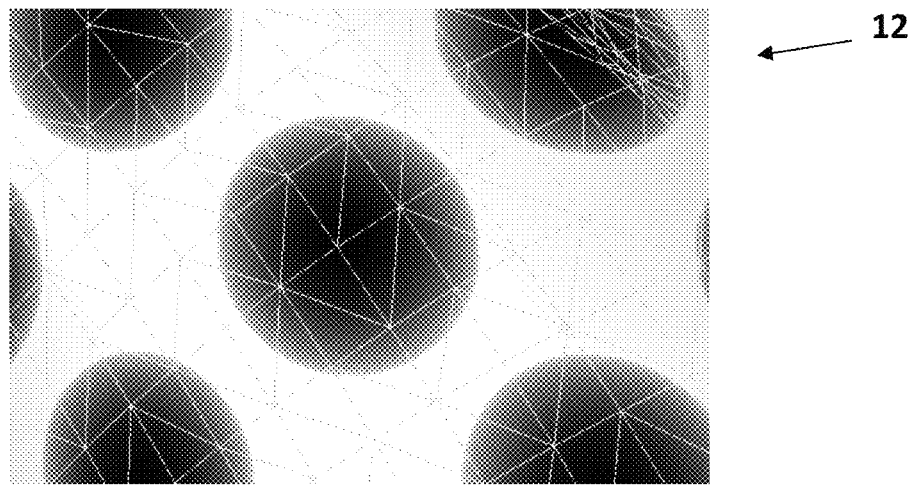
FIG. 9 represents an example of machining layer.

FIG. 9 illustrates a part of a machining layer 12 out of the N machining layers. The triangles represent the 3D meshing of the part whose surface has to be machined, and the black and white image indicates the areas which have to be machined for this layer 12. Thus, the black areas will be machined on this machining layer whereas the white areas will not.

For each black form defined on the surface of the part for the machining layer 12 concerned, a closed patch 15 is computed which consists of all the support triangles partially or totally covered by the form. A support triangle will therefore be able to form part of several closed patches 15 if it is partially covered by several black forms. The closed patch 15 corresponding to a black area fully contained in a single support triangle will therefore be this single support triangle. This step 200 uses conventional black and white image processing techniques.

For example, one way of detecting black forms, based on the elements of the meshing, consists in detecting and in locating the black-white and white-black transitions on each of the sides of each of the support triangles of the 3D meshing, then in joining the transition points and in merging the triangles in order to close the outline of the forms in 3D on the surface of the part.

In the case of white areas included in a black form, only the external outlines of the black form are used to define the candidate closed patch 15.

Figure 10:
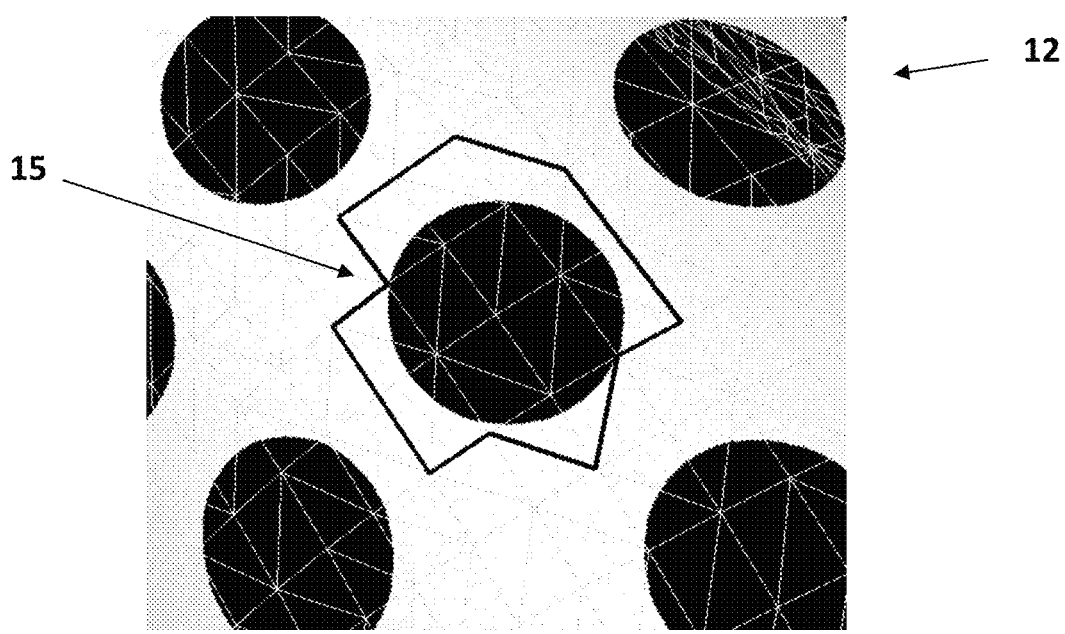
FIG. 10 represents an example of closed patch.

For each machining layer 12, a set of closed patches 15 like that represented in FIG. 10 which corresponds to a black area is thus computed.

Since a patch is intended to be machined from a single position of the laser head 1, a single machining direction will be applied for each of the patches, the machining direction being the direction of the laser ray striking the surface to be machined. Now, each support triangle defines a normal direction, which is the optimal machining direction on the surface of the part modelled by this triangle. Since the surface of the part is not planar, the triangles that make up a patch are not a priori coplanar, and the machining direction applied for a patch therefore forms a non-zero angle with most of the support triangles of this patch. When computing each closed patch 15, an origin direction 20 is computed and associated with the patch, together with the maximum value of the angles formed between computed origin direction 20 and the normals 25 to the support triangles of the patch 15.

Figure 11:
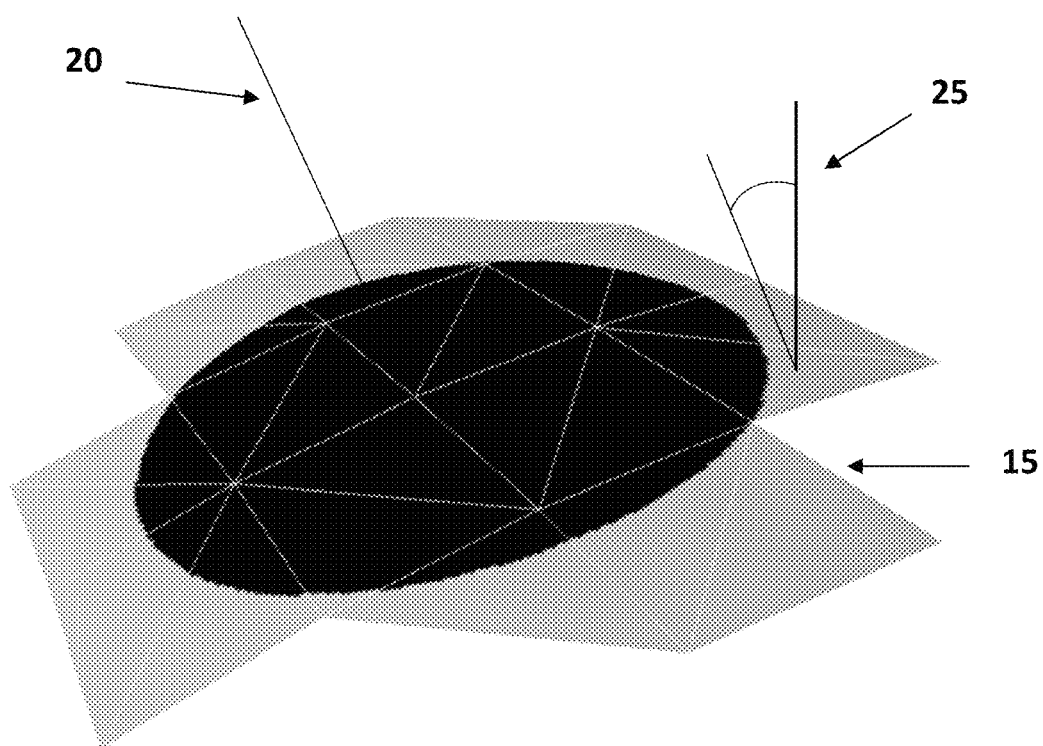
FIG. 11 represents an example of origin direction associated with a closed patch.

FIG. 11 schematically represents a closed patch 15 associated with a form to be machined in a machining layer with its origin direction 20, and the non-zero angle between the origin direction 20 and the normal 25 to a support triangle of the patch 15.

Preferentially, the origin direction 20 is computed so as to obtain a maximum angle with the normals to the triangles which is the smallest possible angle. In effect, the quality of a laser machining deteriorates when the machining angle relative to the normal of the surface exceeds a threshold, and the visual quality depends on the least good machining quality. It is therefore preferable to limit the maximum angle between the machining angle and the normal to the surface.

In the exemplary implementation of the invention, the result of the step 200 is therefore, for each machining layer, a set of closed patches 15 with, associated with each of the patches 15, an origin direction 20 and a maximum angle relative to the normals 25 of the triangles of the patch 15.

In a step 300 of validation of the closed patches 15, the closed patches 15 of each machining layer are validated.

Several criteria are used to validate a closed patch 15. If one of these criteria invalidates a patch, that means that its surface cannot be machined from a single position of the laser head 1 and consequently that it will be necessary to use several open patches to machine this surface in the machining layer concerned, conventionally. An open patch is a patch whose boundary will be affected by the laser ray in its machining. In other words, during the machining of an open patch, the laser ray reaches the boundary of said patch by cutting at least one side of a triangle common with another adjacent open patch.

Figure 12:
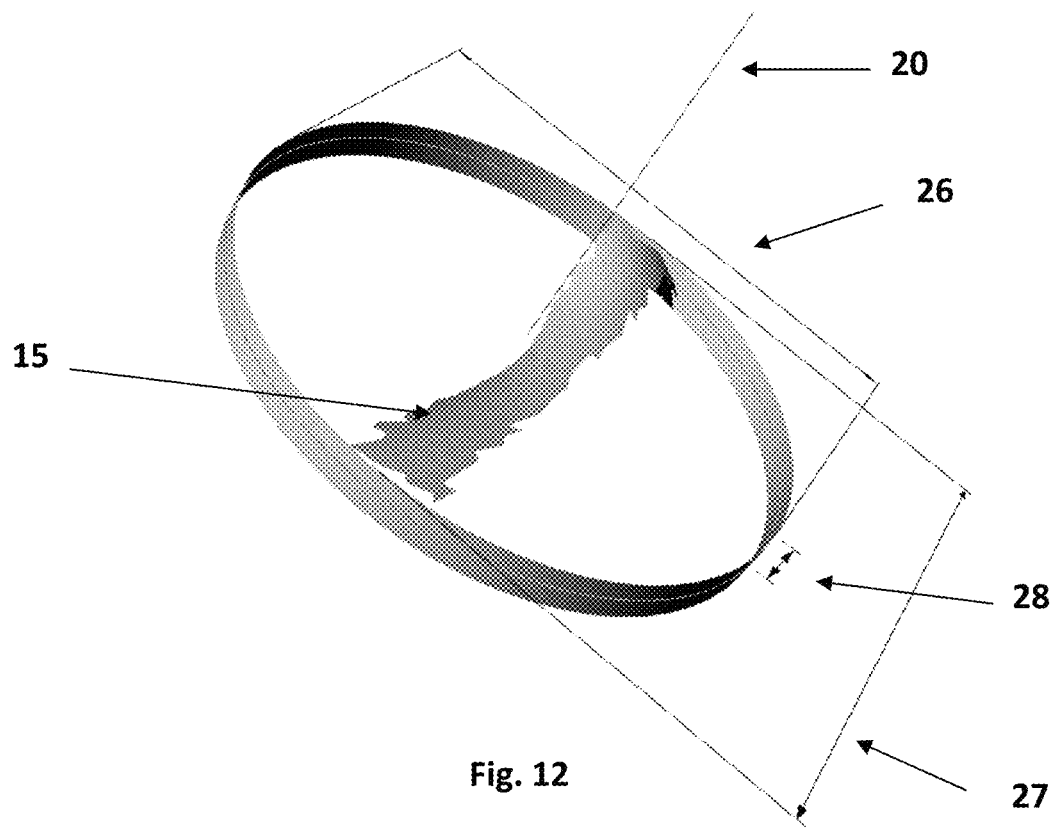
FIG. 12 represents strict constraints that a closed patch must observe to be valid.

The first criteria are of strict application and devolve from the machining capacities of the laser head 1. Thus, the dimensions $D_X$ 26 and $D_Y$ 27 of the projection of the triangles of the patch 15 onto a plane at right angles to the direction 20 associated with the patch must be below thresholds compatible with the theoretical marking field of the laser head 1. Similarly, the variation $D_Z$ 28 of the position of the triangles of the patch in the direction 20 associated with the patch must be below a threshold compatible with the marking depth of the laser head 1. These criteria are schematically represented in FIG. 12. Typically, for a laser head using a focal lens of F254 type, thresholds of 80 mm on X and Y and of 30 mm on Z can be used.

Another strict criterion requires the maximum angle between the origin direction 20 and the normals 25 to the triangles of the patch 15 be below a threshold compatible with the desired machining quality. This criterion of maximum angulation of the patch is parameterizable and can for example be of the order of 20° to 25°.

These criteria can be computed quickly and devolve directly from the dimensions of the patch 15 and from the direction 20 which is associated with it. Since this information is known from the definition of the closed patch, it is advantageous to perform this strict validation as soon as the patch 15 is defined in the definition step 200.

The closed patch validation phase 300 also comprises a machining feasibility test, which consists of several collision tests. The direction 20 associated with each patch makes it possible to determine, in the conventional manner, the relative position of the laser head 1 in relation to the part to be machined according to the five axes. Firstly, the phase 300 validates the fact that the laser head 1 does not come into collision with the surface of the part or with an element of the machine, then it also validates the fact that all of the surface of the patch 15 can be reached, that is to say that the laser ray 2 does not cut another surface of the part or an element of the machine.

Figure 13:
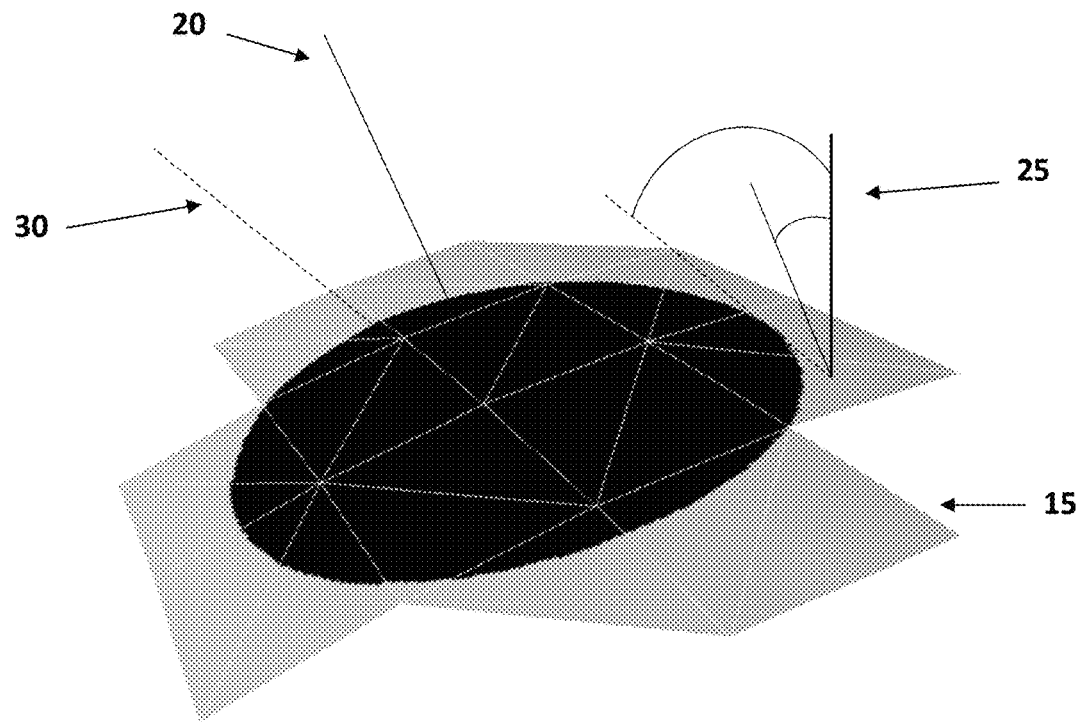
FIG. 13 represents an avoidance direction associated with a closed patch.

If one of these two tests is not conclusive, that is to say if a collision is detected, then avoidance directions 30 are tested. An avoidance direction 30 will be considered, and possibly associated with the patch 15 in place of the origin direction 20, only if the maximum machining angulation of the patch remains below a parameterizable threshold, for example of the order of 50° to 75°. FIG. 13 schematically represents a closed patch 15 with its origin direction 20 and an avoidance direction 30, and the angles that these two directions form with the normal 25 to a triangle of the patch 15.

Advantageously, out of all the possible avoidance directions for a patch 15, the avoidance direction 30 retained will be the one forming the smallest angle with the origin direction 20 associated with this patch.

Alternatively, out of all the acceptable avoidance directions, priority will be given to the avoidance directions 30 closest to the directions 20 or 30 associated with one or more adjacent patches 15 already validated. Advantageously, two patches will be considered adjacent if they have a common triangle or a common triangle side. Thus, the risk of strong angulations between the machining directions of two adjacent patches 15, which are detrimental to the surface quality obtained, is limited.

In a particularly advantageous embodiment, a score computation with weighting parameters makes it possible to use the preceding two criteria by defining the relative importance of the criterion of angulation with the origin direction 20 relative to the criterion of angulation with the direction or directions of the adjacent patch or patches 15 already validated.

Figure 14:
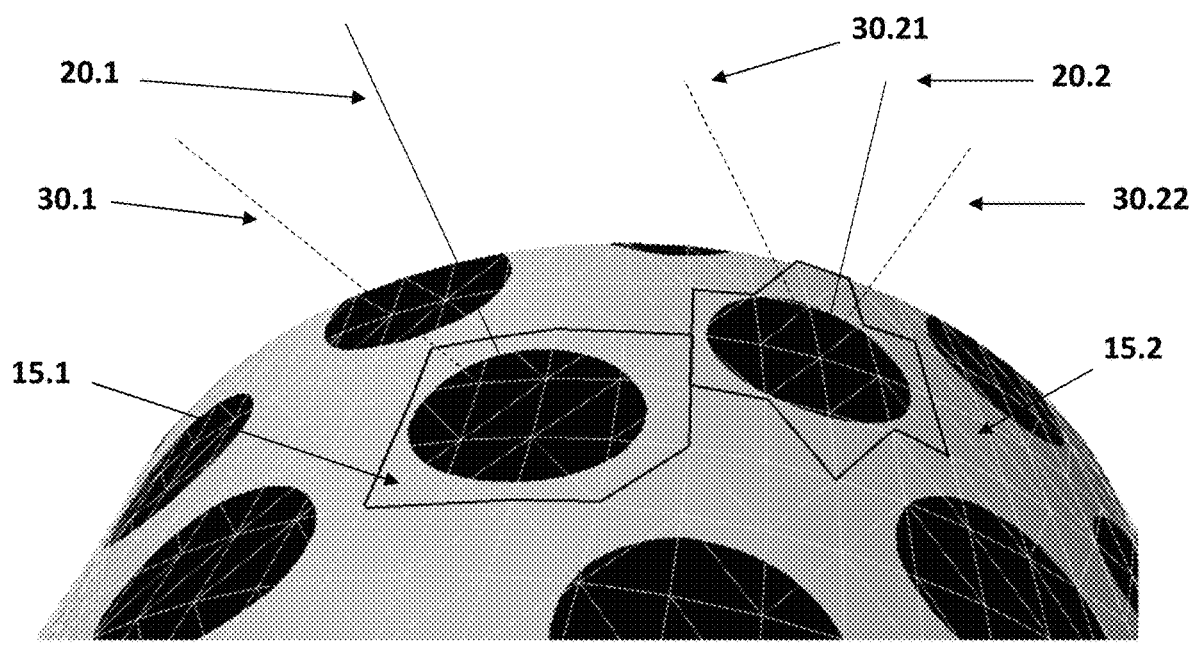
FIG. 14 represents the taking into account of an adjacent patch already validated on the search for an avoidance direction.

FIG. 14 schematically represents a patch 15.1 with its origin direction $D1_o$ 20.1 and its avoidance direction $D1_e$ 30.1 validated, and a patch 15.2 with its origin direction $D2_o$ 20.2 and two possible avoidance directions $D2_{e1}$ 30.21 and $D2_{e2}$ 30.22. In the example represented, it is the avoidance direction $D2_{e1}$ 30.21 which is retained, because its low angulation with the previously validated avoidance direction $D1_e$ 30.1 of the patch 15.1 allows it to obtain a better score than the direction $D2_{e2}$ 30.22.

If an avoidance direction cannot be found for a given closed patch 15, that means that its surface cannot be machined from a single position of the laser head 1 and, consequently, that several non-closed patches must be used to machine this surface in the machining layer concerned, in the conventional way.

It is advantageous to proceed with an optional step 400 of merging of the validated closed patches 15, in order to obtain groups 50 of patches 15 that can be machined successively from a single common position of the laser head 1.

For each merging into a group 50 of validated closed patches, tests with the adjacent validated closed patches 15 are performed, and a direction 55 is associated with the group 50 of merged patches. The choice of the direction 55 retained for the group 50 of merged patches is based on the score computation using the parameters already described, for example the angulation in relation to the origin or avoidance directions associated with the merged patches 15, or else the angulation in relation to the directions associated with the adjacent groups of patches (50), or a weighting of these different parameters. Similarly, when several adjacent closed patches 15 fulfil the criteria to be merged, a system of weighted scores makes it possible to retain, out of these different possible mergings, the one which culminates in the best score. Then, another merging is attempted between the new group of patches and the closed patches which are adjacent to it. The construction of a group 50 of closed patches is thus performed iteratively with successive mergings until there is no more acceptable merging with an adjacent closed patch 15.

Naturally, a merging will be performed only if it also makes it possible to observe the strict criteria, in particular those linked to the dimensions of the marking field.

Figure 15:
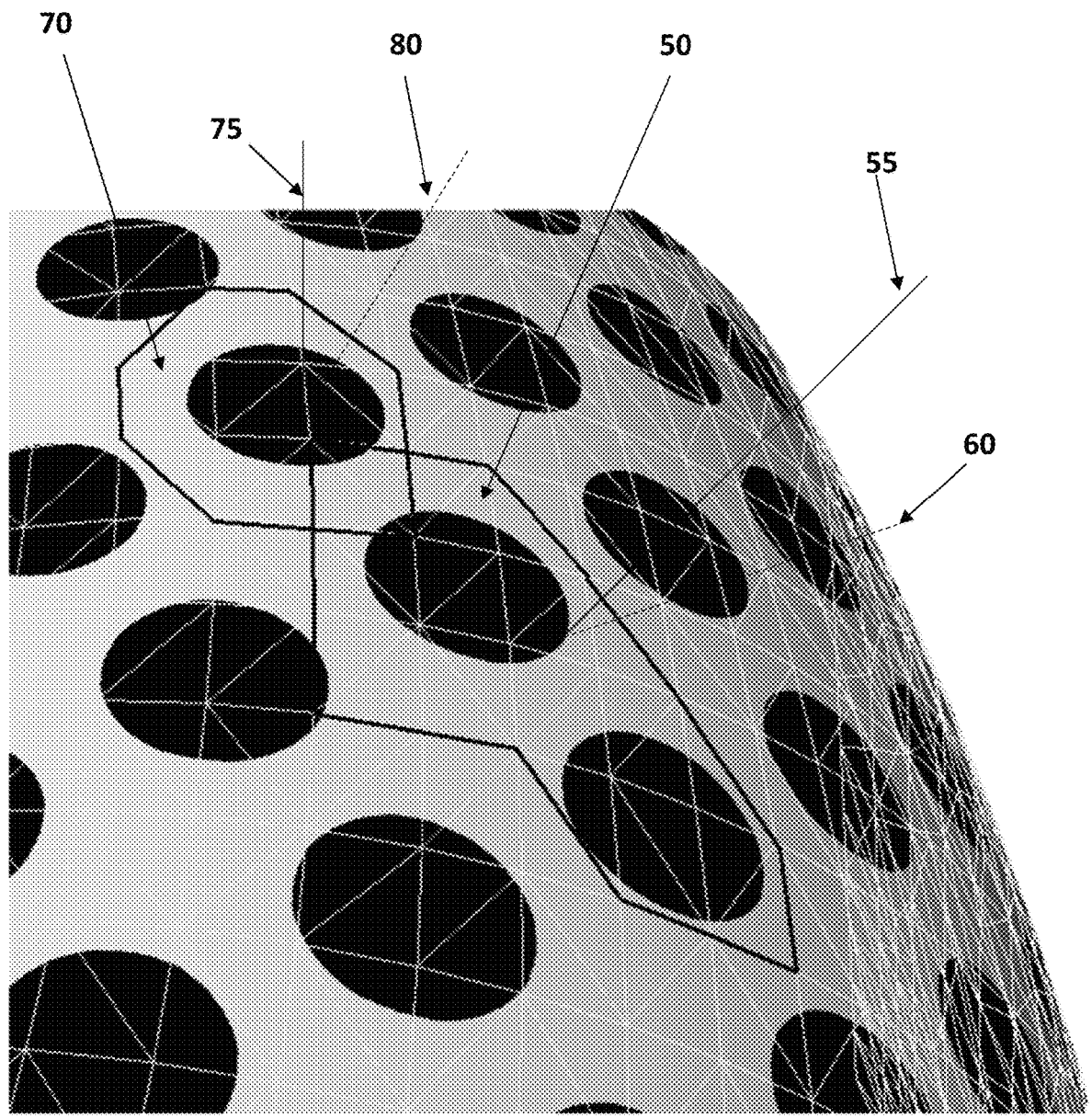
FIG. 15 represents the merging of validated closed patches into a group of patches.

FIG. 15 illustrates a group of patches 50 with an associated origin direction 55 and avoidance direction 60, and a candidate patch 70 with an associated origin direction 75 and avoidance direction 80. The phase 400 of merging of the patches 15 is completed when all the closed patches 15 have been subjected to at least one merging test.

Upon laser machining of the part, all the non-closed patches are machined first in the conventional way, then all the closed patches or groups of merged closed patches are machined machining layer by machining layer.

For a given layer n, when a closed patch $P_n$ has been validated with an associated direction, all the closed patches of the successive layers n+1 . . . N which are included in this patch $P_n$ (that is to say whose support triangles all form part of the support triangles of the patch $P_n$) can also be validated with the same associated direction. Advantageously, a multilayer closed patch is then defined: upon the machining, all the layers of the multilayer patch are successively machined with the same position of the laser head 1, before changing the position of the laser head 1 to machine the next multilayer patch. The multilayer patches can naturally be merged in accordance with the invention according to the same principles as those previously described, the result being the obtaining of groups of merged multilayer patches.

Thus, the definition method according to the invention makes it possible to greatly limit the number of changes of position of the laser machining head or/and of the part to be machined, for example by using groups of patches or multilayer patches, even groups of multilayer patches. A method according to the invention also provides an excellent surface quality by using, as much as possible, closed patches, or when machining directions associated with the patches take account of the directions associated with the adjacent patches.

The invention relates also to a computer program product comprising instructions which, when the program is run by a computer, cause the latter to implement the steps of a method according to the invention; and a computer-readable storage medium comprising instructions which, when they are executed by a computer, cause the latter to implement the steps of the method according to the invention.

The invention claimed is:

1. A method for defining a sequence of positions of a laser head relative to a part, for a machining by a laser ray of a texture etched on a two-dimensional or a three-dimensional surface of the part modeled by a 3D meshing, the method comprising:
    defining a plurality of machining layers to be performed in successions;
    defining for each one of the plurality of machining layers patches to be each machined from a single position of the laser head, the patches including closed patches, the boundary of which is not affected by the laser ray;
    validating the closed patches successively from a first machining layer to a second machining layer of the plurality of machining layers;
    defining open patches whose boundary is affected by the laser ray for any areas of the plurality of machining layers that cannot be machined from validated closed patches;
    wherein the defining of the patches includes associating an origin direction with each one of the defined closed patches; and
    wherein the validating of the closed patches includes assigning a maximum angulation between the origin direction and a normal to elements of the 3D meshing supporting the closed patches.

2. The method of claim 1, wherein the validating includes criteria requiring dimensions of elements of the 3D meshing supporting the closed patches to be below predetermined three-dimensional thresholds.

3. The method of claim 1 wherein the validating includes detecting a collision between the laser head and the part, and upon detection of the collision searching for an avoidance direction associated with the closed patch.

4. The method of claim 3 wherein searching for the avoidance direction includes using a criterion based on a weighting of an angle formed with the origin direction, and of angles formed with the origin direction and the avoidance direction associated with adjacent ones of the validated closed patches.

5. The method of claim 1, further comprising merging the validated closed patches into groups of patches.

6. The method of claim 5, wherein the merging merges multilayer closed patches into groups of multilayer patches.

7. The method of claim 1, wherein when a first closed patch of the closed patches has been validated for the first machining layer with an associated origin direction and avoidance direction, also validated for the second machining layer are the closed patches supported by the same elements of the 3D meshing, thus forming a multilayer closed patch with the same associated direction.

8. The method of claim 1, wherein the method further includes defining the sequence of positions of the laser head relative to the part.

9. A non-transitory computer-readable storage medium comprising instructions which, when executed by a computer, cause the computer to implement the method of claim 1 for defining the sequence of positions of the laser head relative to the part.

\* \* \* \* \*